US012748949B2

(12) United States Patent
Martins et al.

(10) Patent No.: US 12,748,949 B2
(45) Date of Patent: Sep. 29, 2026

(54) CENTRAL NODE AND METHOD THEREIN FOR ENABLING AN AGGREGATED MACHINE LEARNING MODEL FROM LOCAL MACHINE LEARNINGS MODELS IN A WIRELESS COMMUNICATIONS NETWORK

(71) Applicant: Telefonaktiebolaget LM Ericsson (publ), Stockholm (SE)

(72) Inventors: Jean Paulo Martins, Indaiatuba (BR); Amadeu Nascimento Junior, Indaiatuba (BR); Klaus Raizer, Indaiatuba (BR); Ricardo Souza, Indaiatuba (BR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1086 days.

(21) Appl. No.: 17/796,895

(22) PCT Filed: Feb. 6, 2020

(86) PCT No.: PCT/EP2020/052983

§ 371 (c)(1),
(2) Date: Aug. 2, 2022

(87) PCT Pub. No.: WO2021/155930

PCT Pub. Date: Aug. 12, 2021

(65) Prior Publication Data

US 2023/0058223 A1 Feb. 23, 2023

(51) Int. Cl.
*G06N 3/045* (2023.01)
*G06N 3/063* (2023.01)
*G06N 3/08* (2023.01)

(52) U.S. Cl.
CPC ............. *G06N 3/045* (2023.01); *G06N 3/063* (2013.01); *G06N 3/08* (2013.01)

(58) Field of Classification Search
CPC ........... G06N 3/045; G06N 3/063; G06N 3/08
See application file for complete search history.

(56) References Cited

U.S. PATENT DOCUMENTS

2019/0122120 A1* 4/2019 Wu ........................ G06N 3/088

OTHER PUBLICATIONS

Chen et.al, “Efficient GAN-, based method for cyber-intrusion detection” Jul. 24, 2019 (Year: 2019).*

(Continued)

*Primary Examiner* — Alexey Shmatov
*Assistant Examiner* — Duy T Diep
(74) *Attorney, Agent, or Firm* — Murphy, Bilak & Homiller, PLLC

(57) ABSTRACT

A method for enabling a machine learning model to be aggregated from local machine learning models comprised in at least two local nodes in a wireless communications network is provided. The method comprises receiving, from each of the at least two local nodes, a parametrized function of a local machine learning model, a generator function of a local generative model, and a discriminator function of a local discriminative model, wherein the generator function and the discriminator function are trained on the same data as the parametrized function. The method also comprises determining, for each pair of the at least two local nodes, a first cross-discrimination values by applying the received discriminator function from a first local node of the pair on samples generated using the received generator function from the second local node of the pair, and a second cross-discrimination value by applying the received discriminator function from the second local node of the pair on samples generated using the received generator function from the first local node of the pair. The method further comprises obtaining an aggregated machine learning model based on the determined first and second cross-discrimination values. Furthermore, the method comprises transmitting information indicating the obtained aggregated machine learning model to one or more of the at least two local nodes in the wireless communications network.

15 Claims, 7 Drawing Sheets

(56) References Cited

OTHER PUBLICATIONS

Hardy et.al, "MD-GAN: Multi-Discriminator Generative Adversarial Networks for Distributed Datasets", Feb. 6, 2019 (Year: 2019).*
Ferdowsi et.al, "Brainstorming Generative Adversarial Networks (BGANs): Towards Multi-Agent Generative Models with Distributed Private Datasets", Feb. 2, 2020 (Year: 2020).*
Abad, Mehdi Salehi Heydar, et al., "Hierarchical Federated Learning Across Heterogeneous Cellular Networks", XP081474041, www.arvix.org, Sep. 5, 2019, 1-10.
Li, Xiang, et al., "On the Convergence of FedAvg on Non-IID Data", XP055745368, www.arxiv.org, Oct. 8, 2019, 1-26.
McMahan, H. Brendan, et al., "Communication-Efficient Learning of Deep Networks from Decentralized Data", International Conference on Artificial Intelligence and Statistics (AIStats), 2017, 1-10.
Ryu, Seonghan, et al., "Out-of-domain Detection based on Generative Adversarial Network", Proceedings of the 2018 Conference on Empirical Methods in Natural Language Processing, XP055745811, Oct. 31, 2018, 714-718.
Triastcyn, Aleksei, et al., "Federated Generative Privacy", IEEE Intelligent Systems, IEEE Computer Society, 2020, 1-8.

* cited by examiner

CENTRAL NODE AND METHOD THEREIN FOR ENABLING AN AGGREGATED MACHINE LEARNING MODEL FROM LOCAL MACHINE LEARNINGS MODELS IN A WIRELESS COMMUNICATIONS NETWORK

TECHNICAL FIELD

Embodiments herein relate to aggregated machine learning models in a wireless communications network. In particular, embodiments herein relate to a central node and a method therein for enabling an aggregated machine learning model from local machine learning models comprised in at least two local nodes, whereby the central node and the at least two local nodes form parts of a wireless communications network. Further, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

In wireless communications networks as described above, there may be data-related constraints, such as, e.g. data privacy restrictions or restricted data traffic information, that does not allow local data obtained in the RAN to be transferred to other parts of the wireless communications network. This means, for example, that the obtained local data in the RAN cannot be transferred and used as training data in a centralized processing procedure for machine learning. In such scenarios, learning from the obtained local data may only occur locally in the wireless communications network. However, it is also of great interest that learning could also occur from a global perspective.

For example, consider the problem of predicting a word from a prefix typed in a wireless device in a wireless communications network. Every wireless device may be equipped with a machine learning algorithm that is able to model the user typing behaviour in order to suggest a suffix to complete the word. Since many users share a common language, the resulting machine learning models may be averaged locally in the RAN in order to produce aggregated machine learning models that is representative of the problem. Further aggregation of the aggregated local machine learning models in different RANs in order to produce a global aggregated machine learning models is also possible.

Federated Learning, FL, is a technique that is applicable to the above mentioned problem of learning from decentralized data. FL describes how multiple local machine learning models may be averaged in order to create an accurate global machine learning models, see e.g. H. B. McMahan, E. Moore, D. Ramage, S. Hampson and B. A. y. Arcas, "Communication-efficient learning of deep networks from decentralized data," in *International Conference on Artificial Intelligence and Statistics* (*AISTATS*), 2017. However, if we extend the word prediction example described above to also encompass users speaking different languages, then the training data distributions will vary considerably locally from one country to another. In this case, this means that the averaging of local machine learning models originating from varying training data distributions according to the FL technique will most certainly result in an undesired accuracy degradation. This is because, even though the local machine learning models are in the context of a unique global problem, if the local training data distributions are too far apart, then the averaging of the local machine learning models will not lead to a unique globally accurate machine learning model.

Additionally, these scenarios are difficult to handle using conventional FL techniques, since model aggregation using FL techniques is performed by averaging the neural network weights and thus all models, both local and global, are required to have the same machine learning model architecture. Therefore, the global machine learning model might not have the capacity to accurately represent the composition of all local machine learning models. Hence, there is a need to be able to handle the above mentioned scenarios when learning from decentralized data in order to improve the accuracy of global or aggregated machine learning models in wireless communications networks.

SUMMARY

It is an object of embodiments herein to improve the accuracy of machine learning models in a wireless communications network.

According to a first aspect of embodiments herein, the object is achieved by a method performed by a central node for enabling a machine learning model to be aggregated from local machine learning models comprised in at least two local nodes, whereby the central node and the at least two local nodes form parts of a wireless communications network. The method comprises receiving, from each of the at least two local nodes, a parametrized function of a local machine learning model, a generator function of a local generative model, and a discriminator function of a local discriminative model, wherein the generator function and the discriminator function are trained on the same data as the parametrized function. The method also comprises determining, for each pair of the at least two local nodes, a first cross-discrimination values by applying the received discriminator function from a first local node of the pair on samples generated using the received generator function from the second local node of the pair, and a second cross-discrimination value by applying the received discriminator function from the second local node of the pair on samples generated using the received generator function from the first local node of the pair. The method further comprises obtaining an aggregated machine learning model based on the determined first and second cross-discrimination values. Furthermore, the method comprises transmitting information indicating the obtained aggregated machine learning model to one or more of the at least two local nodes in the wireless communications network.

According to a second aspect of embodiments herein, the object is achieved by a central node configured to enable a machine learning model to be aggregated from local machine learning models comprised in at least two local nodes, whereby the central node and the at least two local nodes form parts of a wireless communications network. The central node is configured to receive, from each of the at least two local nodes, a parametrized function of a local machine learning model, a generator function of a local generative model, and a discriminator function of a local discriminative model, wherein the generator function and the discriminator function are trained on the same data as the parametrized function. The central node is also configured to determine, for each pair of the at least two local nodes, a first cross-discrimination value by applying the received discriminator function from the first local node of the pair on samples generated using the received generator function from the second local node of the pair, and a second cross-discrimination value by applying the received discriminator function from the second local node of the pair on samples generated using the received generator function from the first local node of the pair. The central node is further configured to obtain an aggregated machine learning model based on the determined first and second cross-discrimination values. Furthermore, the central node is configured to transmit information indicating the obtained aggregated machine learning model to one or more of the at least two local nodes in the wireless communications network.

According to a third aspect of the embodiments herein, a computer program is also provided configured to perform the method described above. Further, according to a fourth aspect of the embodiments herein, carriers are also provided configured to carry the computer program configured for performing the method described above.

By enabling a machine learning model to be aggregated from local machine learning models comprised in at least two local nodes based on cross-discrimination values as described above, a redundancy and complementarity between different local machine learning models from different local nodes is identified. This information is then be used to determine whether to apply a model averaging technique or perform a new model composition when forming a global or aggregated machine learning model based on the different local machine learning models. Hence, global or aggregated machine learning models that are more robust in their decentralized learning from non-corresponding local data distributions, e.g. non-identically distributed or non-overlapping data distributions, is achieved in the wireless communications network. In turn, this will result in that more accurate machine learning models is able to be composed in the wireless communications network, which thus will improve the accuracy of machine learning models in wireless communications networks.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
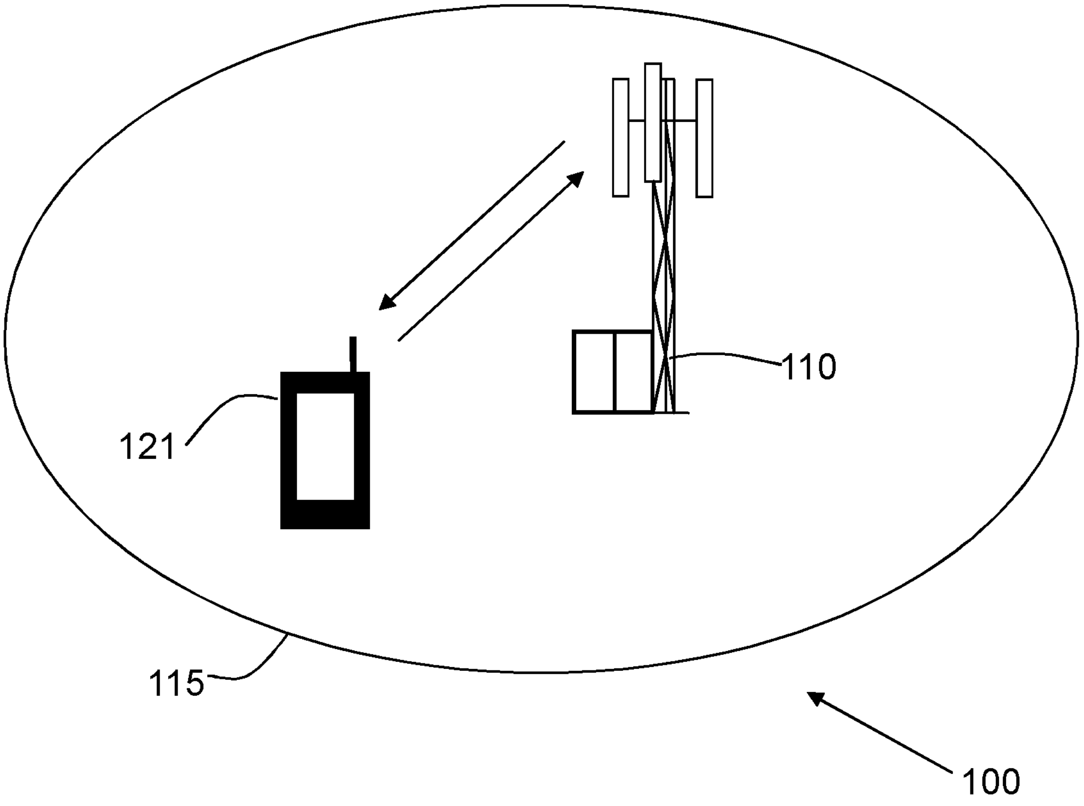
FIG. 1 is a schematic block diagram illustrating a Radio Access Network, RAN, in a wireless communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 depicts a wireless communications network 100 in which embodiments herein may operate. In some embodiments, the wireless communications network 100 may be a radio communications network, such as, New Radio (NR) network. Although, the wireless communications network 100 is exemplified herein as an NR network, the wireless communications network 100 may also employ technology of any one of Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a network node 110. The network node 110 serves at least one cell 115. The network node 110 may correspond to any type of network node or radio network node capable of communicating with a wireless device and/or with another network node, such as, e.g. be a base station, a radio base station, gNB, eNB, eNodeB, a Home Node B, a Home eNode B, femto Base Station (BS), pico BS, etc., in the wireless communications network 100. Further examples of the network node 110 may also be e.g. repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc. It should be noted that the network node 110 may be have a single antenna or multiple antennas, i.e. more than one antenna, in order to support Single User MIMO, SU-MIMO, or Multi-User MIMO, MU-MIMO, transmissions.

In FIG. 1, a wireless device 121 is located within the cell 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc. It should be noted that the wireless device 121 may be have a single antenna or multiple antennas, i.e. more than one antenna, in order to support Single User MIMO, SU-MIMO, or Multi-User MIMO, MU-MIMO, transmissions.

Furthermore, although embodiments below are described with reference to FIG. 1, this should not be construed as limiting to the embodiments herein, but merely as an example made for illustrative purposes.

As part of the developing of the embodiments described herein, it has been realized that, for many real-world applications, there is an undesired accuracy degradation upon composing global or aggregated machine learning models when having different training data sets that are intrinsically multimodal, i.e. when training data from the different datasets are non-corresponding, e.g. non-identically distributed or non-overlapping data distributions. For example, using conventional FL techniques based on averaging may in such cases result in non-robust global or aggregated machine learning models that do not have the possibility to grow in capacity. Hence, it has been realized that there is a problem in how to develop a model composition that is robust in employing decentralized learning from both non-correspondingly and correspondingly distributed training data, while at the same time being independent of the local machine learning model architectures so that the capacity of the developed models may be increased on demand.

By enabling an aggregated machine learning model from local machine learning models comprised in at least two local nodes based on cross-discrimination values as described by the embodiments herein, the locally learned generative machine learning models are used to enable more complex model aggregation schemes that is respecting data privacy constraints, but also allows the aggregated machine learning models to grow if needed. In other words, by identifying redundancy and complementarity between different local machine learning models that allows a determination between applying model averaging or a new model composition, it is possible both to maintain some local machine learning models (e.g. instead of employing the conventional continuous composition of more general global or aggregated machine learning models) and create models of larger capacity than the local machine learning models (e.g. deeper neural networks) allowing the global or aggregated machine learning models to grow if needed. This will enable multiple models learned from decentralized non-correspondingly and correspondingly distributed data to be composed towards a global knowledge of the intended modelled system within the wireless communications network.

Here, it may further be noted that the model composition proposed herein also works if the local models are of a heterogeneous nature. For example, one local model may be a random forest model, while the another local model may be a neural network. Here, the aggregated model may be any machine learning model, albeit at the cost of some retraining. In comparison, conventional FL averaging only works if both local models are neural networks, i.e. homogeneous local models, which require no retraining.

Also, by using locally learned generative machine learning models, i.e. models that comprise generator and discriminator functions, samples that represent the distributions of real data may be generated. These generated samples may then be used to compare the different data distributions or to train other machine learning models with only a small generalization gap. In other words, the latter means that the availability of generative machine learning models allows the use of synthetic data in a centralized node in order to further improve existing machine learning models or compose new machine learning models from the local ones. Hence, compliance with local data privacy constraints may be ensured. Additionally, the use of generative machine learning models also enable possibilities to offload to other nodes in the wireless communications network, for example, in which more computational power, extended capabilities, etc., are available for further improving the local machine learning model.

For the sake of simplicity and in order to describe the embodiments herein, a scenario comprising a wireless communications network 200 having a number of central and local nodes will be described in FIGS. 2-4, but these should not be construed as limiting to the embodiments herein, but merely as an example made for illustrative purposes. It should be noted that although the function of the central node may be implemented in a single node in the wireless communication network 200, it may also be distributed and arranged within a number of cooperative nodes in the wireless communication network 200.

Figure 2:
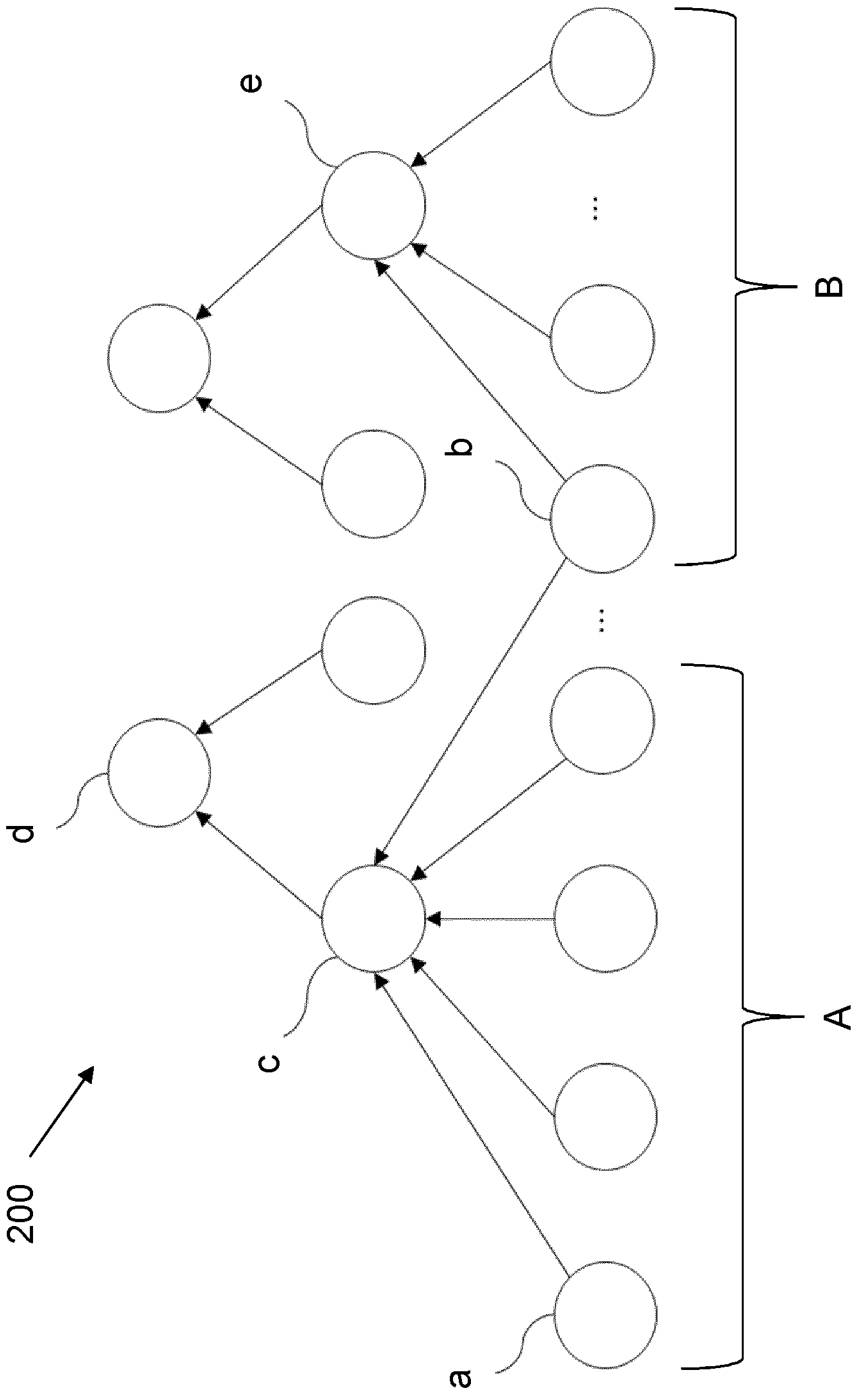
FIG. 2 is a schematic block diagram illustrating an arrangement of central and local nodes in a wireless communications network according to some embodiments.

FIG. 2 illustrates a scenario comprising an general arrangement of central and local nodes in a wireless communications network 200 that is supported by the embodiments described herein. This scenario may also be described as a hierarchical cloud environment where each distributed node have a machine learning task. The local nodes a, b, or training nodes, may refer to any of the distributed nodes that comprises a locally learned generative machine learning model and which participates in the decentralized learning in the wireless communications network 200. The locally learned generative machine learning models, also referred to herein simply as local machine learning models, may be based on data collected locally and comprise labels within a supervised machine learning scenario. The local nodes a, b, may, for example, be any processing unit with embedded machine learning tasks, such as, e.g. wireless devices or network nodes/base stations (e.g. eNB/eNodeBs) in the wireless communications network 100 in FIG. 1. The central nodes c, d, e, or aggregating nodes, may refer to any node capable of performing model composition based on locally learned generative machine learning models from local nodes, such as, e.g. the local nodes a, b. The central nodes c, d, e may typically be hosted by any processing unit with embedded machine learning tasks in the core network of the wireless communications network 100 or in a data communication network connected thereto, e.g. virtual servers in a virtual cloud computing network, etc.

In the scenario and general arrangement in FIG. 2, it should be noted that the central node c may be considered a central or aggregating node concerning the local node a, but also as a training node concerning the central node d. Also, the local node b may be considered a training node to both the central or aggregating nodes c and e. The training nodes may implement regression or classification tasks according to a supervised machine learning scenario whose labels are only available locally on their respective hierarchical level. The embodiments described herein will be described from the perspective of multiple training nodes, i.e. the local nodes a, b, and only one aggregating node, i.e. the central node c, but should not be construed as limited to this simplified illustrative case. In fact, the embodiments described here may be implemented in a distributed manner across several nodes in the wireless communications networks 100, 200. It is further illustrated in FIG. 2 that different nodes in the wireless communications networks 100, 200 may be responsible for computational processing and data acquisition procedures. In some cases, training and aggregating nodes, such as, e.g. the local node a and central node c, may perform data acquisition and local model training. But other processes, such as, e.g. model selection, sample generation, label generation, and model composition, may be executed, performed and run centrally, e.g. in central node d, or at other distributed nodes in the wireless communications networks 100, 200 depending on the different embodiments.

Figure 3:
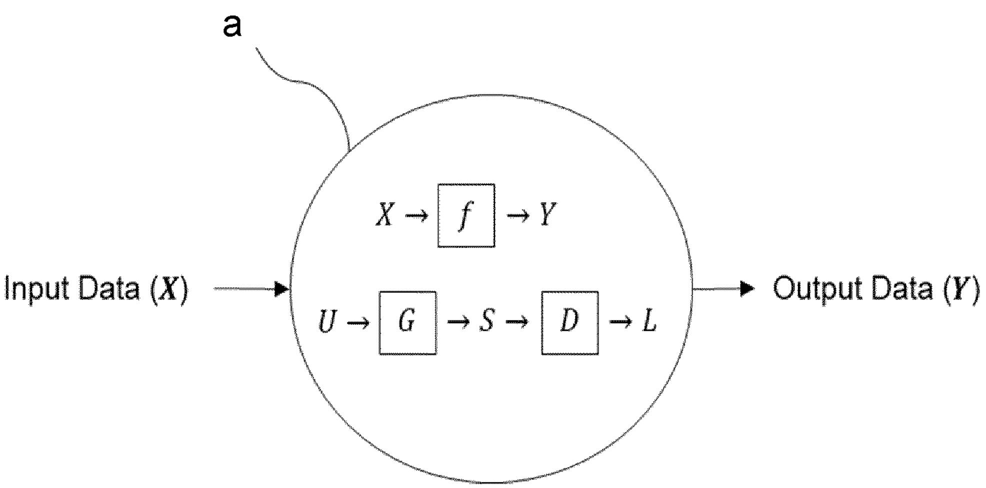
FIG. 3 is a schematic block diagram illustrating embodiments of local machine learning models in local nodes in a wireless communications network.

FIG. 3 illustrates embodiments of a local machine learning model in a local node a in the wireless communications network 200 in FIG. 2. Every training node i in the wireless communications network 200, such as, e.g. the local node a, collects data from an unknown data distribution, see Eq. 1:

$$X \sim p_i(X) \qquad \text{(Eq. 1)}$$

for which labels Y are locally provided by the intended modelled system, wherein $X \in \mathbb{R}^n$ and $Y \in \mathbb{R}^m$, with $n,m \geq 1$ The problem in the training node i, such as, e.g. the local node a, then consists of learning a parameterized function, see. Eq. 2:

$$f_i: R^n \times \Theta \mapsto R^m \qquad \text{(Eq. 2)}$$

from the examples (X, Y). For the sake of simplicity, the function parameters $w_i \in \Theta$ may be considered to be neural network weights. The components of the training node i, such as, e.g. the local node a, is illustrated in FIG. 3, which shows the local node a and its local models (f, G, D) trained from the data (X, Y).

For illustrative purposes, the local nodes, such as, the local node a, comprised in the set of local nodes denoted by A in FIG. 2 may be considered to have correspondingly distributed data, e.g. identical and overlapping data distributions, and the local nodes, such as, the local node b, comprised in the set of local nodes denoted by B in FIG. 2 may be considered to have correspondingly distributed data, e.g. identical and overlapping data distributions. However, the local nodes in the set of local nodes denoted by A may be considered to have non-corresponding data distributions, e.g. non-identical and non-overlapping data distributions, with the local nodes in the set of local nodes denoted by B.

Here, it should be noted that if the data of the training nodes are identically distributed, such as, e.g. among the local nodes in the sets of local nodes denoted by A or among the local nodes in the sets of local nodes denoted by B, then the averaging strategy employed by Federated Learning, FL, techniques may suffice; for example, as long as the local nodes employ neural networks and there is no need or requirement to grow the capacity of the aggregated network model. However, in the case of non-corresponding data distributions among the training nodes, such as, e.g. between the local node a in the set of local nodes denoted by A and local node b in the set of local nodes denoted by B, between which the local machine learning models are too different, then averaging of FL techniques may lead to considerable accuracy degradation. This may also be a poor alternative in case the local nodes employ heterogeneous models and/or in case there is a need or requirement to grow the capacity of the aggregated network model.

According to some embodiments herein, in order to solve this problem within model composition from non-corresponding distributed data, every training node i is to provide a triple of functions ($f_i$, $G_i$, $D_i$) which describe its locally learned machine learning model to its aggregating node. The parameterized function $f_i$ may typically be a local regressor or regressive function, i.e. a regression/classification function. The function $G_i$, may be a local generator or generative model for the local training data distribution. The function $D_i$ may be a local discriminator or discriminative model. The pair of generator and discriminator functions ($G_i$, $D_i$) may be the result of training a generative adversarial network, GAN, on the same data used to train the parameterized function $f_i$.

As may be seen in FIG. 3, the role of the generator function $G_i$: $\mathbb{R}^n \to \mathbb{R}^n$ is to produce samples $S \sim p_i(X)$ from random noise inputs $u \sim U(0,1)^n$. Conversely, the role of the discriminator function $D_i$: $\mathbb{R}^n \to \mathbb{R}$, is to take a sample from S as input, and output a probability L that indicates how likely is that the input sample comes from a data distribution that is different from $p_i(X)$. Provided enough computational processing power in the training node i, the triple of functions ($f_i$, $G_i$, $D_i$) may be learned simultaneously from the same input data $X \sim p_i(X)$.

Figure 4:
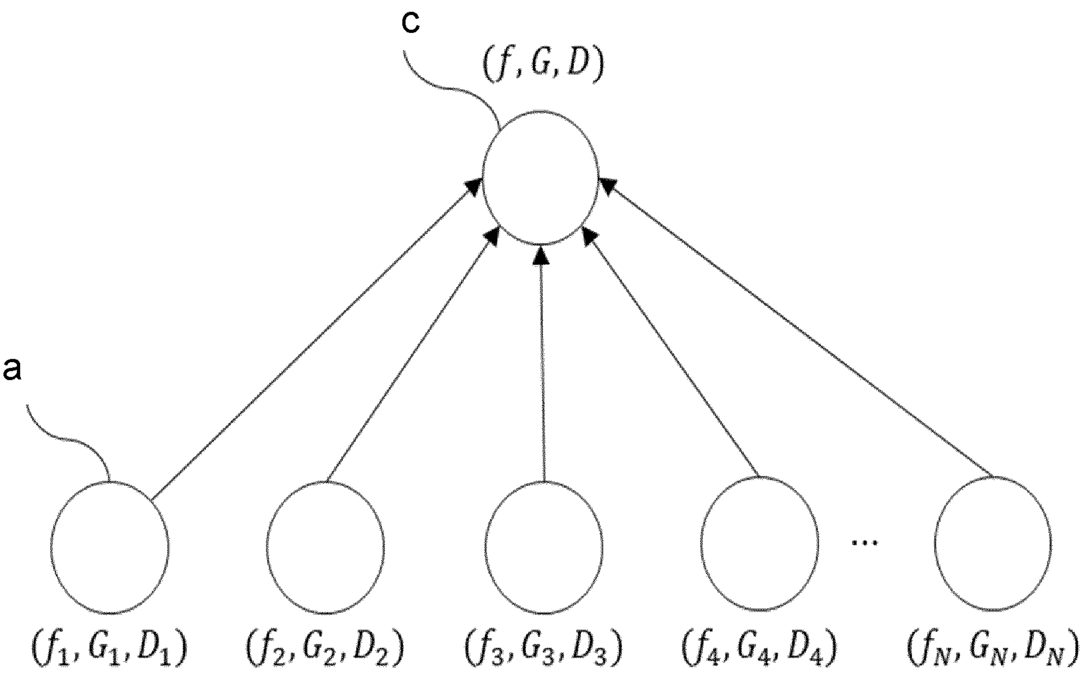
FIG. 4 is a schematic block diagram illustrating embodiments of a machine learning model in a central node aggregated from local machine learning models in local nodes in a wireless communications network.

FIG. 4 illustrates embodiments of a machine learning model (f, G, D) in a central node c that has been aggregated from local machine learning models ($f_i$, $G_i$, $D_i$) in local nodes a, b in a wireless communications network 200. In FIG. 4, the local machine learning models produced locally in N number of training nodes ($f_1$, $G_1$, $D_1$), ($f_2$, $G_2$, $D_2$), . . . , ($f_N$, $G_N$, $D_N$), such as, e.g. local nodes a, b in the wireless communications networks 100, is communicated to at least one aggregating node, such as, e.g. the central node c. Thus, a unique composed model (f, G, D) may be obtained by the central node c based on the received local machine learning models produced locally by the N number of training nodes ($f_1$, $G_1$, $D_1$), ($f_2$, $G_2$, $D_2$), . . . , ($f_N$, $G_N$, $D_N$).

Examples of embodiments of a method performed by a central node c for enabling a machine learning model to be aggregated from local machine learning models comprised in at least two local nodes a, b, whereby the central node c and the at least two local nodes a, b, form parts of a wireless communications network 100, 200, will now be described with reference to the flowchart depicted in FIG. 5. According to some embodiments, the central node c may be a single central node c in the wireless communications network 100, 200, or implemented in a number of cooperative nodes c, d, e in the wireless communications network 100, 200.

Figure 5:
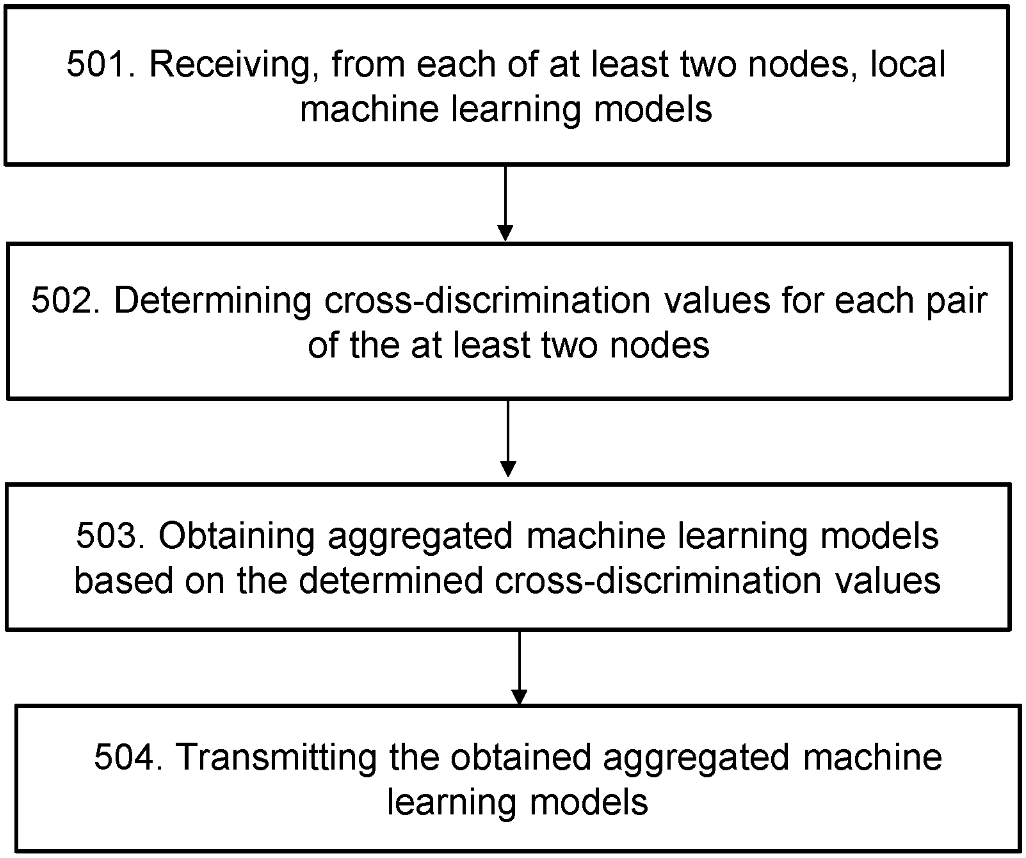
FIG. 5 is a flowchart depicting embodiments of a method in a central node of a wireless communications network.

FIG. 5 is an illustrated example of actions or operations which may be taken by the central node c in the wireless communication network 100, 200. The method may comprise the following actions.

Action 501

The central node c receives, from each of the at least two local nodes a, b, a parametrized function $f_a$, $f_b$ of a local machine learning model, a generator function $G_a$, $G_b$ of a local generative model, and a discriminator function $D_a$, $D_b$ of a local discriminative model, wherein the generator function $G_a$, $G_b$ and the discriminator function $D_a$, $D_b$ are trained on the same data as the parametrized function $f_a$, $f_b$. This means that each of the at least two local nodes a, b that is participating in the learning may transmit their local machine learning functions ($f_a$, $G_a$, $D_a$) and ($f_b$, $G_b$, $D_b$), respectively, to the central node c.

In some embodiments, the generator function $G_a$, $G_b$ and the discriminator function $D_a$, $D_b$ are the result of a training a generative adversarial network, GAN. A generative adversarial network, GAN, is a class of machine learning systems in which two neural network contest with each other and, given a training data set, learns to generate new data with the same statistics as the training set. Normally, a generative neural network generates candidates, while a discriminative network evaluates them. The contest operates in terms of data distributions. Typically, the generative network learns to map from a latent space to a data distribution of interest, while the discriminative network distinguishes candidates produced by the generator from the true data distribution. A known dataset serves as the initial training data for the discriminator. Training it involves presenting it with samples from the training dataset, until it achieves acceptable accuracy. The generator trains based on whether it succeeds in fooling the discriminator. Typically the generator is seeded with randomized input that is sampled from a predefined latent space (e.g. a multivariate normal distribution). Thereafter, candidates synthesized by the generator are evaluated by the discriminator. The generator is typically a de-convolutional neural network, and the discriminator is typically a convolutional neural network. It should be noted that the generative model and discriminative model are usually, but not necessarily, neural networks.

Action 502

After receiving the functions of the local machine learning models from each of the at least two local nodes a, b, the central node c determines, for each pair of the at least two local nodes a, b, a first cross-discrimination value $d_{a,b}$ by applying the received discriminator function $D_a$ from a first local node a of the pair on samples generated using the received generator function $G_b$ from the second local node b of the pair. The central node c also determines a second cross-discrimination value $d_{b,a}$ by applying the received discriminator function $D_b$ from the second local node b of the pair on samples generated using the received generator function $G_a$ from the first local node a of the pair. This means that the central node c is able to, via the first and second cross-discrimination values $d_{a,b}$, $d_{b,a}$, determine how well the data distributions of the local nodes a, b correspond with each other, e.g. whether or not the data distributions are identical or overlapping.

Figure 6:
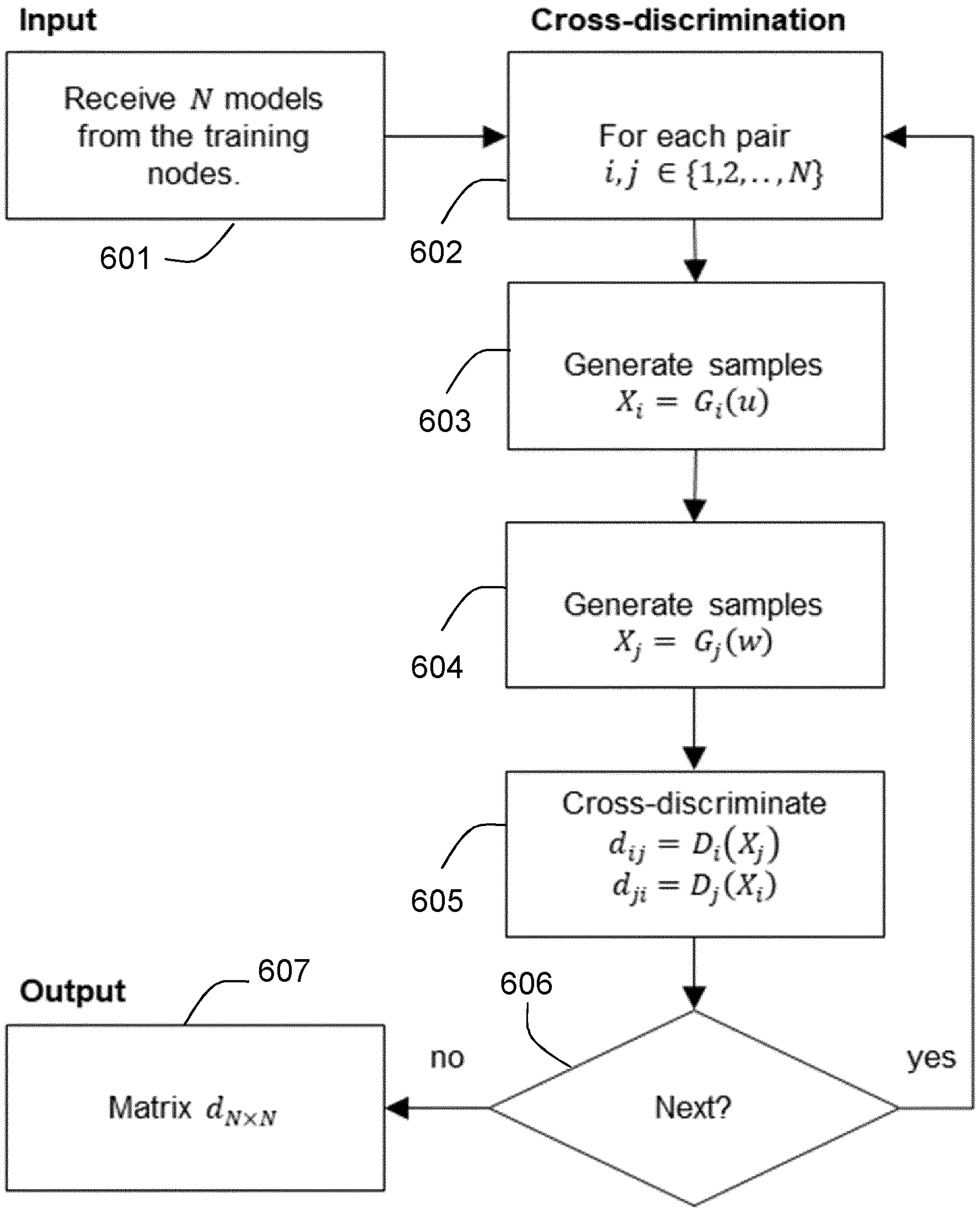
FIG. 6 is another flowchart depicting embodiments of a method in a central node.

FIG. 6 describes an example of a cross-discrimination algorithm performed by a central node c in which the first and second cross-discrimination values are determined according to some embodiments. In Action 601, the central node c may first receive the triple of the local machine learning model functions from N number of training nodes, such as, e.g. local nodes a, b. In Action 602, the central node c may then create pairs of training nodes such that there is a pair for each combination of the N number of training nodes. In Action 603, for a first pair of training nodes, the central node c may generate samples using the generative function of the local generative model of a first training node in the first pair of training nodes. In Action 604, for the first pair of training nodes, the central node c may then generate samples using the generative function of the local generative model of a second training node in the first pair of training nodes. In Action 605, the central node c may apply the discriminator function from the first training node of the first pair of training nodes on the samples generated in Action 604, while also applying the discriminator function from the second training node of the first pair of training nodes on the samples generated in Action 603. In Action 606, the central node c may then repeat the Actions 603-605 for each of the pairs created in Action 602 in order to populate a cross-discrimination matrix $d_{N \times N}$ in Action 607. The cross-discrimination matrix $d_{N \times N}$ will thus comprise information indicating how well the data distributions of each pair of training nodes correspond with each other.

As seen in FIG. 6, the cross-discrimination algorithm may receive a set of N local triple models as input, and output a matrix $d_{N \times N}$ of first and second cross-discrimination values. Given a pair of training nodes $i,j \in \{1, 2, \ldots, N\}$, with $i \neq j$, the following can be said about the underlying data distributions of $G_i$ and $G_j$:

i. If $d_{ij}$ and $d_{ji}$ are small, then the data distributions of $G_i$ and G may be considered as corresponding, e.g. identically distributed.
ii. If $d_{ij}$ is small and $d_{ji}$ is large, then the data distributions of $G_i$ comprises the data distributions of $G_j$ range.
iii. If $d_{ij}$ is large and $d_{ji}$ is small, then the data distributions of $G_i$ is comprised in the data distribution of $G_j$ range.
iv. If $d_{ij}$ and $d_{ji}$ are large, then the data distributions of $G_i$ and $G_j$ are disjoint, that is, non-corresponding, e.g. non-identical or non-overlapping.

Since the discriminator functions output values that indicate the probability of a sample being from another data distribution, small values usually indicate that the sample comes from the same training data distribution as that of the discriminator. Therefore, the use of the terms "small" and "large" above follows the intuition. However, when implementing this in a real application, proper definition for these terms must of course be specified, for example, in terms of threshold values. Also, in order to be comparable, the first and second cross-discrimination values may also be normalized.

Hence, in some embodiments, the determined first and second cross-discrimination values $d_{a,b}$, $d_{b,a}$ may be normalized based on the data from which the local machine learning models of the at least two local nodes a, b originates. In this case, according to some embodiments, the normalized first and second cross-discrimination values $d_{a,b}$, $d_{b,a}$ may indicate that the local machine learning models of the at least two local nodes a, b originates from data having the determined level of non-corresponding or non-overlapping distribution when the normalized first and second cross-discrimination values $d_{a,b}$, $d_{b,a}$ both are above a first threshold value. Also, the normalized first and second cross-discrimination values $d_{a,b}$, $d_{b,a}$ may indicate that the local machine learning models of the at least two local nodes a, b originates from data having the determined level of corresponding or overlapping distribution when the normalized first and second cross-discrimination values $d_{a,b}$, $d_{b,a}$ both are below a second threshold value.

It should also be noted that the averaging strategy of FL techniques may in some cases, e.g. when having homogeneous local models, be appropriate for situation i; whereas, in situation iv, wherein the local machine learning models come from disjoint data distributions, the model composition algorithm is more appropriately selected. For the cases ii and iii in which one of the data distributions comprises the other may be handled in specific ways depending on the use case.

Action 503

After the determination in Action 502, the central node c obtains an aggregated machine learning model based on the determined first and second cross-discrimination values $d_{a,b}$, $d_{b,a}$. This means that the central node c may use the determined first and second cross-discrimination values $d_{a,b}$, $d_{b,a}$ in order to determine how to obtain a more suitable aggregated machine learning model rather than to treat each of the received local machine learning models as if they originated from the same data distributions. It should here be noted that obtaining the aggregated machine learning model may comprise the central node c instructing, or providing information to, one or more other cooperative network nodes in the wireless communications network 100, 200, e.g. having better processing power, extended capabilities, or in any other way being more suitable than the central node c to compose the aggregated machine learning models, such that the one or more other cooperative network nodes may perform the actual model composition of the aggregated machine learning model, and subsequently return a composed aggregated machine learning model to the central node c. However, the central node c may also be configured to compose the aggregated machine learning model itself. This will be described in more detail in the embodiments below, but should also be understood as equally applicable in case of having other cooperative network nodes performing the actual aggregated model composition.

In some embodiments, the central node c may obtain, in case the determined first and second cross-discrimination values $d_{a,b}$, $d_{b,a}$ indicates that the local machine learning models of the at least two local nodes a, b originates from data having a determined level of corresponding or overlapping distribution, the aggregated machine learning model by averaging neural network weights of the local machine learning model of the at least two local nodes a, b. In this case, this will not lead to any considerable accuracy degradation due to the fact that the data distributions corresponds with each other. In this case, the central node c may obtain the aggregated machine learning model by averaging the neural network weights of the local machine learning models of the at least two local nodes a, b by using one or more Federated Learning, FL, techniques. This means that the central node c may proceed according to conventional methods, since the central node c has verified that the data distributions associated with the local machine learning models of the at least two local nodes a, b really correspond with each other. This, of course, provided that the local machine learning models of the at least two local nodes a, b are homogeneous neural networks.

Also, in some embodiments, the central node c may obtain, in case the determined first and second cross-discrimination values $d_{a,b}$, $d_{b,a}$ indicates that the local machine learning models of the at least two local nodes a, b originates from data having a determined level of non-corresponding or non-overlapping distribution, the aggregated machine learning model by using samples generated by the received generator functions $G_a$, $G_b$ of the at least two local nodes a, b. In this case, averaging neural network weights of the local machine learning model of the at least two local nodes a, b would lead to considerable accuracy degradation in the aggregated machine learning model due to the fact that the data distributions do not correspond with each other. Hence, according to some embodiments herein, the aggregated machine learning model should be obtained in a different way. Here, according to some embodiments, the central node c may obtain the aggregated machine learning model by training an existing aggregated machine learning model, or composing a separate aggregated machine learning model, by using the samples generated by the received generator functions $G_a$, $G_b$ and labels generated by applying the parametrized functions $f_a$, $f_b$ on the samples generated by the received generator functions $G_a$, $G_b$. This enables the central node c to select different machine learning models for the aggregation of the local machine learning models of the at least two local nodes a, b, when it has verified that the data distributions associated with the local machine learning models of the at least two local nodes a, b do not correspond with each other.

This further also enables the central node c to, according to some embodiments, compose a new separate aggregated machine learning model wherein the composed separate aggregated machine learning model has a different machine learning model architecture than the local machine learning models of the at least two local nodes a, b. This means that the central node c, for example, may create models of larger capacity than the locally learned generative local machine learning models (e.g. deeper neural networks) allowing the aggregated machine learning model to grow if needed. Thus, it is also possible to compose multiple models learned from decentralized non-identically distributed data towards a global knowledge of the intended modelled system within the wireless communications network.

Optionally, in some embodiments, the central node c may further obtain the aggregated machine learning model by training a parametrized function $f_{ab}$ of an aggregated local machine learning model by using the samples generated by the received generator functions $G_a$, $G_b$ and labels generated by applying the parametrized functions $f_a$, $f_b$ on the samples generated by the received generator functions $G_a$, $G_b$. Additionally, in some embodiments, the central node c may also obtain the aggregated machine learning model by training a generator function $G_{ab}$ of an aggregated generative model and a discriminator function $D_{ab}$ of an aggregated discriminative model by using samples generated by the received generator functions $G_a$, $G_b$. This means that the central node c may compose a new aggregated triple machine learning model of similar accuracy as, for example, existing ones, based on an input a set of local triple models originating from similar data distributions.

Figure 7:
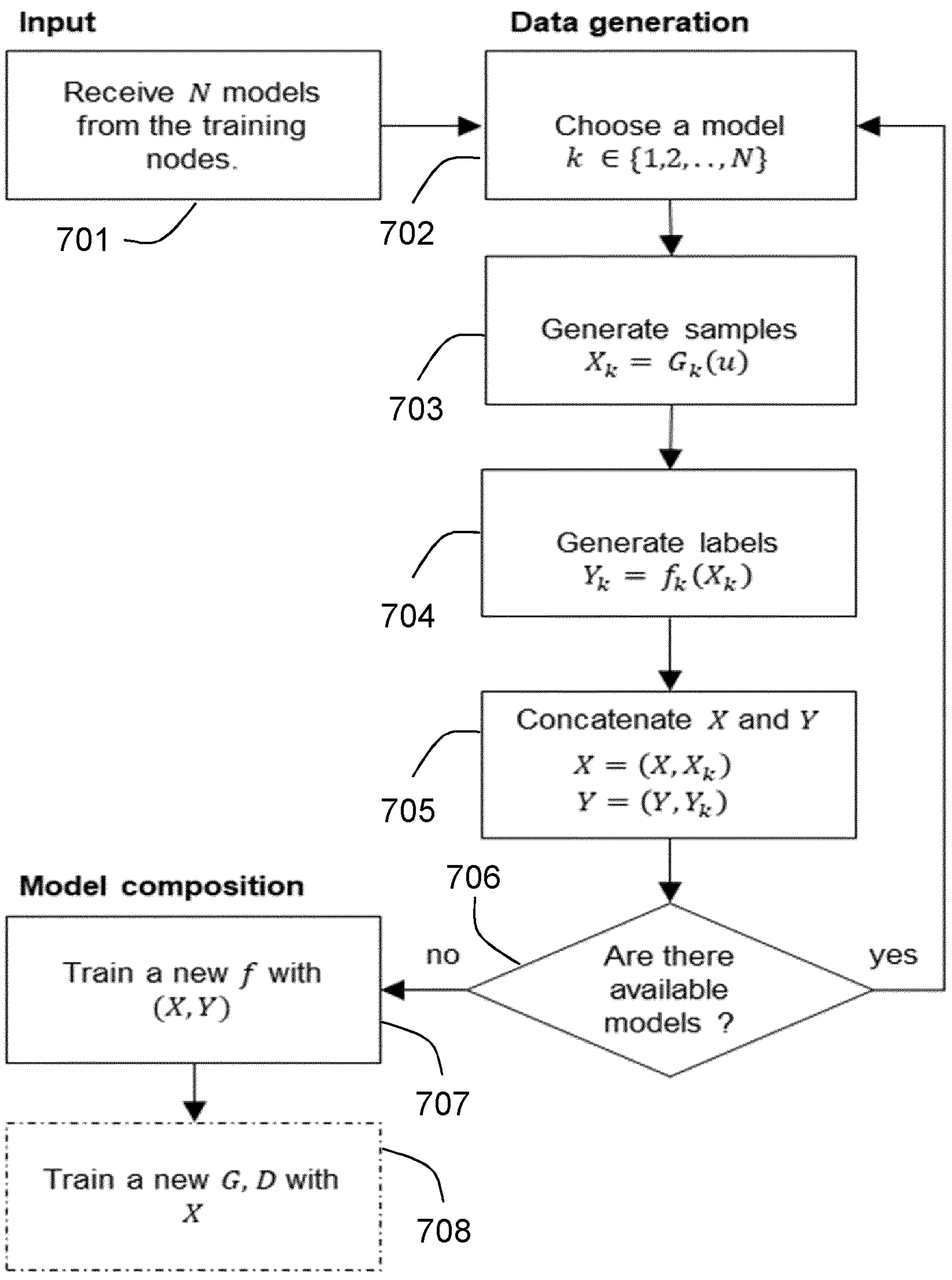
FIG. 7 is a further flowchart depicting embodiments of a method in a central node.

FIG. 7 describes an example of a model composition algorithm performed by a central node c according to some embodiments. In Action 701, the central node c may first receive the triple of the local machine learning model functions from N number of training nodes, such as, e.g. local nodes a, b. In Action 702, the central node c may choose or select a triple of the local machine learning model functions from one of the training nodes, such as, e.g. local node a. In Action 703, the central node c may generate samples by using the received generator function $G_a$ in the selected triple of the local machine learning model functions from one of the training nodes, such as, e.g. local node a. In Action 704, the central node c may generate labels by applying the parametrized functions $f_a$ on the samples generated by the received generator functions $G_a$ in Action 703. In Action 705, the central node c may concatenate the generated samples and labels with the input and output data, respectively, of the selected triple of the local machine learning model functions from one of the training nodes, such as, e.g. local node a. In Action 706, the central node c may then use the cross-discrimination values obtained via e.g. a cross-discrimination algorithm as described in reference to FIG. 6, in order to determine whether there are any available machine learning models into which the selected triple of the local machine learning model functions from one of the training nodes, such as, e.g. local node a, should be aggregated, of if a new separate aggregated machine learning model is to be composed for the selected triple of the local machine learning model functions from one of the training nodes, such as, e.g. local node a. If a new separate aggregated machine learning model is to be composed for the selected local machine learning model of the at least two local nodes a, b, the central node c may proceed to Action 707. Otherwise, the central node c may proceed to Action 702 and select the next triple of the local machine learning model functions from one of the training nodes, since an available machine learning model into which the selected triple of the local machine learning model functions from one of the training nodes, such as, e.g. local node a, should be aggregated was found. In Action 707, the central node c may train a new aggregated parametrized function f based on the input and output data concatenated in Action 705. Optionally, in Action 708, the central node c may also train a new aggregated generative function G and a new aggregated generative function D based on the input data concatenated in Action 705.

As seen in FIG. 7, the model composition algorithm performed by a central node c according to some embodiments may receive as input a set of N local triple models, and may output a composed, or aggregated, triple model of similar accuracy. This model composition algorithm works for locally learned machine learning models coming from correspondingly or non-correspondingly, e.g. identically or non-identically, distributed data. However, it should be noted that the averaging procedure available for correspondingly distributed data using, for example, FL techniques, is much simpler and less time-consuming. Therefore, for scalability reasons, it should be of interest to only perform model composition if needed. The model composition algorithm in FIG. 7 describe how the locally learned machine learning models (each in the form of a triple model comprising a parametrized function f, a generative model G and a discriminative model D) may be used to assess if locally learned machine learning models coming from non-correspondingly distributed data is to trigger a new model composition instead of averaging. However, as described above, given a set of N machine learning models $(f_1, G_1, D_1)$, $(f_2, G_2, D_2)$, . . . $(f_N, G_N, D_N)$ from N number of training nodes, such as, the local nodes a, b, a pairwise computation must first be performed, such as, the one described above in reference to the cross-discrimination algorithm shown in FIG. 6. This pairwise computation producing values that are useful for comparing the underlying data distributions of two generative models.

It may also be noted that the model composition algorithm has a worst-case complexity $O(N^2)$, which is efficient if N is of moderate size.

Action 504

After the obtaining the aggregated machine learning model in Action 503, the the central node c transmits information indicating the obtained aggregated machine learning model to one or more of the at least two local nodes a, b in the wireless communications network 100, 200. This means that the local nodes a, b, will receive an aggregated machine learning model that is based on a larger combined data set than that of the locally learned generative machine learning model that each of them transmitted to the central node c, without any inherent accuracy degradation due to that the larger combined data set originates from non-corresponding distributed data sets.

Figure 8:
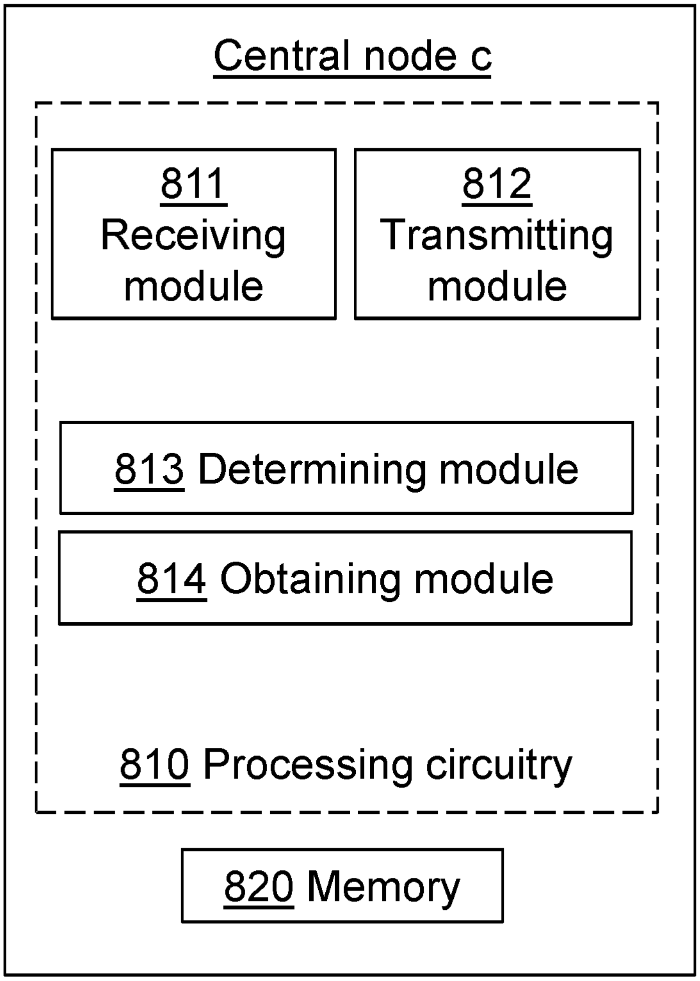
FIG. 8 is a block diagram depicting embodiments of a central node.

To perform the method actions in a central node c configured to enable a machine learning model to be aggregated from local machine learning models comprised in at least two local nodes a, b, whereby the central node c and the at least two local nodes a, b, form parts of a wireless communications network 100, 200, the central node c may comprise the following arrangement depicted in FIG. 8. FIG. 8 shows a schematic block diagram of embodiments of the central node c. The embodiments of the central node c described herein may be considered as independent embodiments or may be considered in any combination with each other to describe non-limiting examples of the embodiments described herein.

The central node c may comprise processing circuitry 810, and a memory 820. The central node c, or the processing circuitry 810, may also comprise a receiving module 811 and a transmitting module 812. The receiving module 811 and the transmitting module 812 may comprise circuitry capable of receiving and transmitting information from other network nodes in the wireless communications network 100, 200. The receiving module 811 and the transmitting module 812 may also form part of a single transceiver. It should also be noted that some or all of the functionality described in the embodiments above as being performed by the central node c may be provided by the processing circuitry 810 executing instructions stored on a computer-readable medium, such as, e.g. the memory 820 shown in FIG. 8. Alternative embodiments of the central node c may comprise additional components, such as, for example, a determining module 813 and an obtaining module 814, each responsible for providing its respective functionality necessary to support the embodiments described herein.

The central node c or processing circuitry 810 is configured to, or may comprise the receiving module 811 configured to, receive, from each of the at least two local nodes a, b, a parametrized function $f_a$, $f_b$ of a local machine learning model, a generator function $G_a$, $G_b$ of a local generative model, and a discriminator function $D_a$, $D_b$ of a local discriminative model, wherein the generator function $G_a$, $G_b$ and the discriminator function $D_a$, $D_b$ are trained on the same data as the parametrized function $f_a$, $f_b$. Also, the central node c or processing circuitry 810 is configured to, or may comprise the determining module 813 configured to, determine, for each pair of the at least two local nodes a, b, a first cross-discrimination value $d_{a,b}$ by applying the received discriminator function $D_a$ from the first local node a of the pair on samples generated using the received generator function $G_b$ from the second local node b of the pair, and a second cross-discrimination value $d_{b,a}$ by applying the received discriminator function $D_b$ from the second local node b of the pair on samples generated using the received generator function $G_a$ from the first local node a of the pair. The central node c or processing circuitry 810 is further configured to, or may comprise the obtaining module 814 configured to, obtain an aggregated machine learning model based on the determined first and second cross-discrimination values $d_{a,b}$, $d_{b,a}$. Furthermore, the central node c or processing circuitry 810 is configured to, or may comprise the transmitting module 812 configured to, transmit information indicating the obtained aggregated machine learning model to one or more of the at least two local nodes a, b in the wireless communications network 100, 200.

In some embodiments, the central node c or processing circuitry 810 may further be configured to, or may comprise the obtaining module 814 configured to, obtain, in case the determined first and second cross-discrimination values $d_{a,b}$, $d_{b,a}$ indicates that the local machine learning models of the at least two local nodes a, b originates from data having a determined level of corresponding or overlapping distribution, an aggregated machine learning model by averaging neural network weights of the local machine learning models of the at least two local nodes a, b. Here, the central node c or processing circuitry 810 may further be configured to, or may comprise the obtaining module 814 configured to, obtain an aggregated machine learning model by averaging neural network weights of the local machine learning models of the at least two local nodes a, b using one or more Federated Learning, FL, techniques.

Also, the central node c or processing circuitry 810 may further be configured to, or may comprise the obtaining module 814 configured to, obtain, in case the determined first and second cross-discrimination values $d_{a,b}$, $d_{b,a}$ indicates that the local machine learning models of the at least two local nodes a, b originates from data having a determined level of non-corresponding or non-overlapping distribution, an aggregated machine learning model by using samples generated by the received generator functions $G_a$, $G_b$ of the at least two local nodes a, b.

Here, the central node c or processing circuitry 810 may further be configured to, or may comprise the obtaining module 814 configured to, obtain an aggregated machine learning model by being configured to train an existing aggregated machine learning model, or by composing a separate aggregated machine learning model, by using the samples generated by the received generator functions $G_a$, $G_b$ and labels generated by applying the parametrized functions $f_a$, $f_b$ on the samples generated by the received generator functions $G_a$, $G_b$. In this case, the composed separate aggregated machine learning model has a different machine learning model architecture than the local machine learning models of the at least two local nodes a, b. Furthermore, in some embodiments, the central node c or processing circuitry 810 may further be configured to, or may comprise the obtaining module 814 configured to, obtain an aggregated machine learning model by being configured to train a parametrized function $f_{ab}$ of an aggregated local machine learning model by using the samples generated by the received generator functions $G_a$, $G_b$ and labels generated by applying the parametrized functions $f_a$, $f_b$ on the samples generated by the received generator functions $G_a$, $G_b$. Also, the central node c or processing circuitry 810 may further be configured to, or may comprise the obtaining module 814 configured to, obtain an aggregated machine learning model by being configured to train a generator function $G_{ab}$ of an aggregated generative model and a discriminator function $D_{ab}$ of an aggregated discriminative model by using samples generated by the received generator functions $G_a$, $G_b$.

In some embodiments, the central node c or processing circuitry 810 may be configured to, or may comprise the determining module 813 configured to, normalize the determined first and second cross-discrimination values $d_{a,b}$, $d_{b,a}$ based on the data from which the local machine learnings models of the at least two local nodes a, b originates. In this case, the normalized first and second cross-discrimination values $d_{a,b}$, $d_{b,a}$ indicates that the local machine learning models of the at least two local nodes a, b originates from data having the determined level of non-corresponding or non-overlapping distribution when the normalized first and second cross-discrimination values $d_{a,b}$, $d_{b,a}$ both are above a first threshold value. Here, the normalized first and second cross-discrimination values $d_{a,b}$, $d_{b,a}$ also indicates that the local machine learning models of the at least two local nodes a, b originates from data having the determined level of corresponding or overlapping distribution when the normalized first and second cross-discrimination values $d_{a,b}$, $d_{b,a}$ both are below a second threshold value.

In some embodiments, the generator function $G_a$, $G_b$ and the discriminator function $D_a$, $D_b$ may be the result of a training a generative adversarial network, GAN. Further, according to some embodiments, the central node c may be a single central node in the wireless communications network 100, 200. Optionally, the central node c may be implemented in a number of cooperative nodes c, d, e in the wireless communications network 100, 200.

Furthermore, the embodiments for enabling a machine learning model to be aggregated from local machine learning models comprised in at least two local nodes a, b, whereby the central node c and the at least two local nodes a, b, form parts of a wireless communications network 100, 200 described above may be implemented through one or more processors, such as the processing circuitry 810 in the central node c depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the central node c. The computer program code may e.g. be provided as pure program code in the central node c or on a server and downloaded to the central node c. Thus, it should be noted that the modules of the central node c may in some embodiments be implemented as computer programs stored in memory, e.g. in the memory modules 820 in FIG. 8, for execution by processors or processing modules, e.g. the processing circuitry 810 of FIG. 8.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

DL Downlink
eNodeB/eNB evolved NodeB
FL Federated Learning
GAN Generative Adversarial Network
LTE Long Term Evolution
RAN Radio Access Network,
UE User Equipment
UL Uplink

The invention claimed is:

1. A method performed by a central node for enabling a machine learning model to be aggregated from local machine learning models comprised in at least two local nodes, whereby the central node and the at least two local nodes form parts of a wireless communications network, the method comprising receiving, from each of the at least two local nodes, a parametrized function of a local machine learning model, a generator function of a local generative model, and a discriminator function of a local discriminative model, wherein the generator function and the discriminator function are trained on the same data as the parametrized function;

determining, for each pair of the at least two local nodes, a first cross-discrimination value by applying the received discriminator function from a first local node of the pair to samples generated using the received generator function from the second local node of the pair, and a second cross-discrimination value by applying the received discriminator function from the second local node of the pair to samples generated using the received generator function from the first local node of the pair;

obtaining an aggregated machine learning model based on the determined first and second cross-discrimination values; and transmitting information indicating the obtained aggregated machine learning model to one or more of the at least two local nodes in the wireless communications network.

2. The method of claim 1, wherein obtaining the aggregated machine learning model further comprises obtaining, in case the determined first and second cross-discrimination values indicate that the local machine learning models of the at least two local nodes originate from data having a determined level of corresponding or overlapping distribution, the aggregated machine learning model by averaging neural network weights of the local machine learning model of the at least two local nodes; and obtaining, in case the determined first and second cross-discrimination values indicate that the local machine learning models of the at least two local nodes originate from data having a determined level of non-corresponding or non-overlapping distribution, the aggregated machine learning model by using samples generated by the received generator functions of the at least two local nodes.

3. The method of claim 2, wherein obtaining the aggregated machine learning model by averaging neural network weights of the local machine learning models of the at least two local nodes uses one or more Federated Learning techniques.

4. The method of claim 2, wherein obtaining the aggregated machine learning model by using samples generated by the received generator functions further comprises training an existing aggregated machine learning model, or composing a separate aggregated machine learning model, by using the samples generated by the received generator functions and labels generated by applying the parametrized functions to the samples generated by the received generator functions.

5. The method of claim 4, wherein the composed separate aggregated machine learning model has a different machine learning model architecture than the local machine learning models of the at least two local nodes.

6. The method of claim 2, wherein obtaining an aggregated machine learning model by using samples generated by the received generator functions further comprises training a parametrized function of an aggregated local machine learning model by using the samples generated by the received generator functions and labels generated by applying the parametrized functions to the samples generated by the received generator functions.

7. The method of claim 6, further comprises training a generator function of an aggregated generative model and a discriminator function of an aggregated discriminative model by using samples generated by the received generator functions.

8. The method of claim 1, wherein the determined first and second cross-discrimination values are normalized based on the data from which the local machine learning models of the at least two local nodes originate.

9. The method of claim 8, wherein the normalized first and second cross-discrimination values indicate that the local machine learning models of the at least two local nodes originate from data having the determined level of non-corresponding or non-overlapping distribution when the normalized first and second cross-discrimination values both are above a first threshold value, and wherein the normalized first and second cross-discrimination values indicate that the local machine learning models of the at least two local nodes originate from data having the determined level of corresponding or overlapping distribution when the normalized first and second cross-discrimination values both are below a second threshold value.

10. The method of claim 1, wherein the generator function and the discriminator function are the result of a training a generative adversarial network.

11. The method of claim 1, wherein the central node is a single central node in the wireless communications network, or implemented in a number of cooperative nodes in the wireless communications network.

12. A central node configured to enable a machine learning model to be aggregated from local machine learning models comprised in at least two local nodes whereby the central node and the at least two local nodes form parts of a wireless communications network, wherein the central node comprises:

transceiver circuitry configured to communicate with other nodes of the wireless communications network, and processing circuitry operatively coupled to the transceiver and comprising program instructions executable by the processing circuitry whereby the central node is configured to:

receive, from each of the at least two local nodes, a parametrized function of a local machine learning model, a generator function of a local generative model, and a discriminator function of a local discriminative model, wherein the generator function and the discriminator function are trained on the same data as the parametrized function, determine, for each pair of the at least two local nodes, a first cross-discrimination value by applying the received discriminator function from the first local node of the pair to samples generated using the received generator function from the second local node of the pair, and a second cross-discrimination value by applying the received discriminator function from the second local node of the pair to samples generated using the received generator function from the first local node of the pair, and obtain an aggregated machine learning model based on the determined first and second cross-discrimination values, and transmit information indicating the obtained aggregated machine learning model to one or more of the at least two local nodes in the wireless communications network.

13. The central node of claim 12, further configured to:

obtain, in case the determined first and second cross-discrimination values indicate that the local machine learning models of the at least two local nodes originate from data having a determined level of corresponding or overlapping distribution, an aggregated machine learning model by averaging neural network weights of the local machine learning models of the at least two local nodes, and obtain, in case the determined first and second cross-discrimination values indicate that the local machine learning models of the at least two local nodes originate from data having a determined level of non-corresponding or non-overlapping distribution, an aggregated machine learning model by using samples generated by the received generator functions of the at least two local nodes.

14. The central node of claim 13, further configured to obtain an aggregated machine learning model by averaging neural network weights of the local machine learning models of the at least two local nodes using one or more Federated Learning techniques.

15. A non-transitory computer-readable medium comprising, stored thereupon, a computer program comprising instructions configured so that, when executed in a processing circuitry, the computer program causes the processing circuitry to carry out the method of claim 1.

* * * * *